US008416935B2

United States Patent
Coleman et al.

(10) Patent No.: US 8,416,935 B2
(45) Date of Patent: Apr. 9, 2013

(54) METHODS AND SYSTEMS FOR CALLING CONFERENCE PARTICIPANTS TO ESTABLISH A CONFERENCE CALL

(75) Inventors: David Coleman, Mountain View, CA (US); Andrey Kovalenko, Union City, CA (US); Ed Navarrete, San Jose, CA (US); Amitabh Sinha, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 423 days.

(21) Appl. No.: 12/556,504

(22) Filed: Sep. 9, 2009

(65) Prior Publication Data

US 2010/0061538 A1    Mar. 11, 2010

Related U.S. Application Data

(60) Provisional application No. 61/095,611, filed on Sep. 9, 2008.

(51) Int. Cl.
*H04M 3/42* (2006.01)

(52) U.S. Cl. .................... 379/202.01; 379/158; 370/260; 370/261

(58) Field of Classification Search ............. 379/202.01, 379/158; 370/260, 261
See application file for complete search history.

(56) References Cited

U.S. PATENT DOCUMENTS

| 2002/0091769 | A1* | 7/2002 | Drozdzewicz et al. ....... 709/204 |
| 2008/0037748 | A1  | 2/2008 | Jefferson et al. |
| 2008/0037751 | A1* | 2/2008 | Aldrey et al. ............ 379/202.01 |
| 2008/0205616 | A1* | 8/2008 | Teng et al. ............... 379/202.01 |

FOREIGN PATENT DOCUMENTS

| WO | WO-02/056193 | 7/2002 |
| WO | WO-02/089457 | 11/2002 |

OTHER PUBLICATIONS

International Preliminary Report on Patentability on PCT/US2009/056404 dated Mar. 24, 2011.
International Search Report on PCT/US2009/056404 dated Mar. 18, 2010.
Written Opinion on PCT/US2009/056404 dated Mar. 18, 2010.

* cited by examiner

*Primary Examiner* — Xu Mei
*Assistant Examiner* — Paul Kim
(74) *Attorney, Agent, or Firm* — Foley and Lardner LLP; Christopher J. McKenna

(57) ABSTRACT

A conference call system comprising at least a gateway, a conference reservation agent and a multiport conference unit, can establish conference calls by calling conference call participants at a phone number specified by the conference call participants. When a user initiates a conference, an identifier is assigned to the conference and a URL referencing this identifier is transmitted to each conference participant. Upon clicking the URL, conference participants are presented with a web-form within which the participants can entered a preferred phone number and further join the conference. The multiport conference unit receives each participant phone number and calls the participants at that phone number. Upon establishing a telecommunication connection with each participant, the multiport conference unit bridges the multiple call legs to establish the conference call.

20 Claims, 10 Drawing Sheets

METHODS AND SYSTEMS FOR CALLING CONFERENCE PARTICIPANTS TO ESTABLISH A CONFERENCE CALL

RELATED DISCLOSURES

This U.S. Patent Application claims priority to U.S. Provisional Patent Application Ser. No. 61/095,611, filed on Sep. 9, 2008, the disclosure of which is considered part of the disclosure of this application and is herein incorporated by reference in its entirety.

FIELD OF THE DISCLOSURE

This disclosure relates to establishing conference calls. In particular, this disclosure relates to establishing conference calls by calling the conference call participants.

BACKGROUND OF THE DISCLOSURE

Businesses typically use conference calls as a means for communicating with clients, vendors and fellow employees who are located in different remote locations. In many instances, conference calls can be established by bridging together multiple communication connections established between a switch or bridge and conference call participants. Each communication connection is established when a conference call participant calls a predetermined number that rings the conference call bridge and establishes a communication connection. The conference call participants are bridged into a common connection by the switch or bridge. Typically, establishing the communication connection between each conference call participant and the switch or bridge requires the conference call participants to call a predetermined number and/or enter a conference call passcode. Conference call participants use their own phone service which can be costly. Additionally, it can be cumbersome to have to remember predetermined conference call phone numbers and passcodes.

In some systems, a conference host can bear the cost of contacting the conference call participants by calling the participants at a predetermined phone number. These systems are, however, not desirable because they require knowledge of the participant's phone number such that the participant must be located at that phone number. This system does not allow the conference participants to change their location or otherwise change their phone number. Rather, the conference is configured to call a predetermined phone number that often times cannot be changed. The conference may be configured days in advance, therefore once the user accepts the conference call, the user cannot change his/her contact number.

The undesirable requirements of a typical conference call system stem from the requirement that users pay money to dial a conference call phone number, remember a conference call phone number, remember a conference call passcode or access code and/or locate themselves in a location where they can be reached at the predetermined phone number programmed into the conference. Thus, a conference call system that eliminates the requirement to call a phone number and therefore pay to establish a phone call would be desirable. This system would likely also eliminate the requirement that conference call participants remember a conference call phone number, and in some cases a conference call passcode.

SUMMARY OF THE DISCLOSURE

In the broadest reasonable interpretation of the present disclosure, described herein are methods and systems for generating a conference call bridge by calling participants of a conference call. Typical conference call systems are cumbersome to use because they require participants to call a conference call phone number and, in most cases, enter a phone number, supra. The methods and systems described herein address these problems by, in some embodiments, establishing a conference call bridge by calling each conference call participant. These methods and systems eliminate the need for participants to spend money calling a conference call number and the need for participants to know or remember a conference call number by calling the participants rather than requiring the participants to call a conference call phone number. Furthermore, conference call participants need not submit their contact phone number days in advance. Rather, they can submit their contact phone number at any time prior to the phone conference and in some cases, during the phone conference. Thus, in some embodiments, the methods and systems described herein eliminate the drawbacks associated with typical conference call systems.

In one aspect, described herein, is an embodiment of a method for generating a conference call bridge by calling conference participants using at least one multiport conference unit. A gateway device of a conference call system includes at least one multiport conference unit. The gateway device can receive call information from each conference participant, where the call information can comprise a phone number specified by each conference participant. At least one multiport conference unit of the conference call system can call each conference participant at the phone number specified by the conference participant. The at least one multiport conference unit can then establish a conference call bridge responsive to receiving at least two call acceptance acknowledgements from at least two conference participants. The conference call bridge can comprise a communication connection between the conference call bridge and communication devices of the conference participants.

In one embodiment, the conference call system receives a request from a user to initiate a conference. The conference call system then generates a uniform resource locator (URL) that comprises a conference identifier representing a conference generated responsive to receiving the request. The gateway device transmits the URL to the conference participants, and receives a notification indicating that at least one conference participant selected the URL. Responding to the received notification, the gateway device requests a phone number from each conference participant. In one embodiment, the call information can be specified by the conference participant responsive to receiving the gateway device request. In another embodiment, each conference participant is associated with the conference identifier representing the conference. Requesting the phone number, in some embodiments, further comprises sending the at least one conference participant a web-form.

In one embodiment, the gateway device receives call information including phone numbers and conference participant identifiers.

In another embodiment, the multiport conference unit receives an access code from a conference participant designated as the chairperson. The multiport conference unit, in some embodiments, establishes the conference call bridge responsive to receiving the at least two call acceptance acknowledgements from the conference participants and the access code from the chairperson.

In another embodiment, the multiport conference calls each conference participant via a telecommunication switching system interconnected with a public switched telecommunication network.

In another embodiment, the conference call system determines a received phone number is invalid and calls a predetermined default phone number.

In another aspect, described herein, is an embodiment of a method for responding to a request to initiate a conference call. A conference call system that comprises a gateway device and at least one multiport conference unit, receives a request from a user to initiate a conference. The conference call system generates a uniform resource locator (URL) that includes a conference identifier representing a conference generated responsive to receiving the request. The gateway device transmits the URL to a plurality of conference participants identified by the user. The gateway device receives a notification indicating that at least one conference participant selected the URL. Responsive to receiving the notification, the gateway device requests a phone number from at least one conference participant, the phone number used by the multiport conference unit to call at least one conference participant to establish a conference call bridge.

In one embodiment, the gateway device receives call information from each conference participant. The call information can comprise a phone number specified by each conference participant response to the gateway device request. The multiport conference unit can call each conference participant at the specified phone number. The multiport conference unit can establish a conference call bridge responsive to receiving at least two call acceptance acknowledgements from at least two conference participants. The conference call bridge can comprise a communication connection between the conference call bridge and communication devices of at least two conference participants. In some embodiments, receiving the call information can further comprise receiving call information that comprises phone numbers and conference participant identifiers. In another embodiment, the at least one multiport conference unit receives an access code from a conference participant that is designated as the chairperson. The conference call bridge can, in some embodiments, be established responsive to receiving the at least two call acceptance acknowledgements and the access code from the chairperson.

In some embodiments, each conference participant is associated with the conference identifier representing the conference. In other embodiments, requesting a phone number comprises sending the at least one conference participant a webform.

The at least one multiport conference unit, in some embodiments, calls via a telecommunication switching system interconnected with a public switched telecommunication network.

In other embodiments, a determination is made that a received phone number is invalid, and a call is placed to a predetermined default phone number.

In still other embodiments, multimedia data is transmitted over the established conference call bridge

BRIEF DESCRIPTION OF DRAWINGS

The following figures depict certain illustrative embodiments of a method and system for establishing a conference call, where like reference numerals refer to like elements. Each depicted embodiment is illustrative of the method and system and not limiting.

DETAILED DESCRIPTION

Figure 1A:
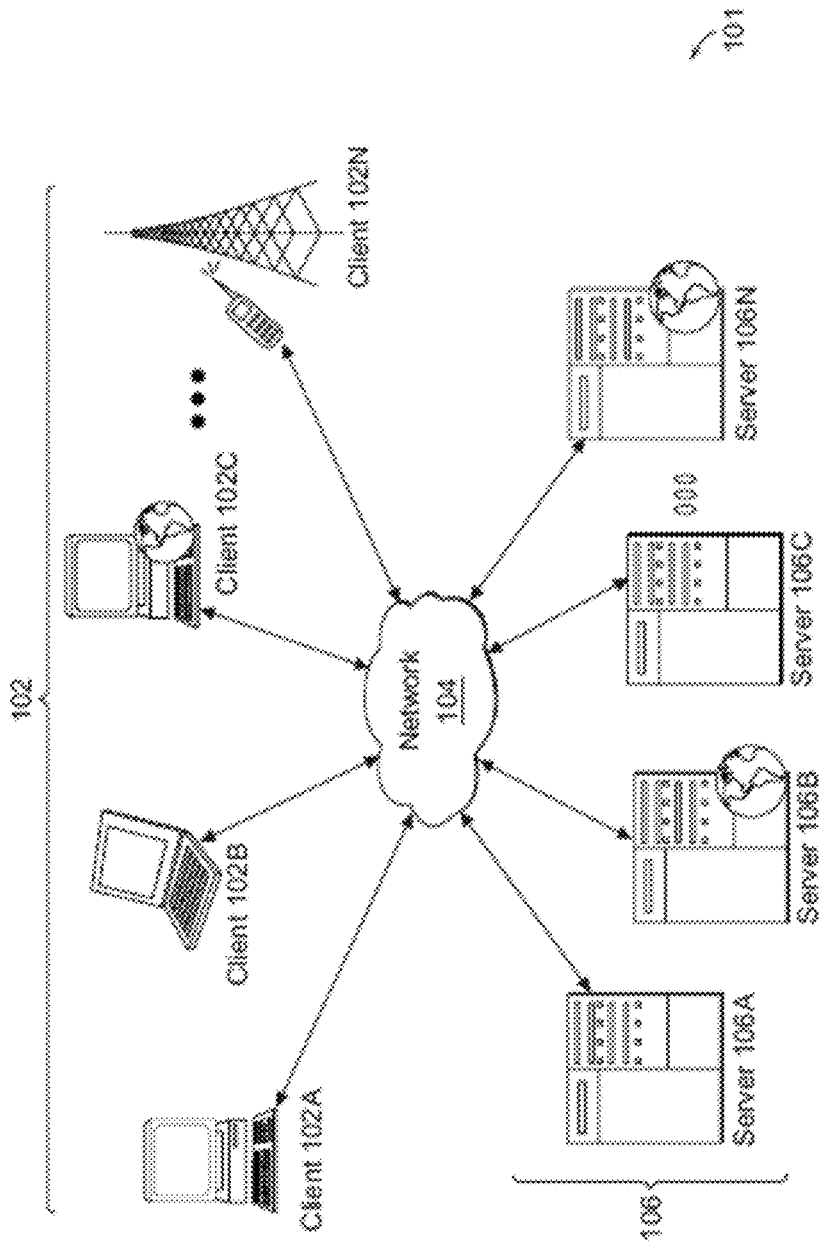
FIG. 1A depicts embodiments of network environments that provide remote access to computing devices that can execute application programs.

FIG. 1A illustrates one embodiment of a computing environment 101 that includes one or more client machines 102A-102N in communication with servers 106A-106N, and a network 104 installed in between the client machines 102A-102N and the servers 106A-106N. In some embodiments, client machines 102A-10N may be referred to as a single client machine 102 or a single group of client machines 102, while servers may be referred to as a single server 106 or a single group of servers 106. One embodiment includes a single client machine 102 communicating with more than one server 106, another embodiment includes a single server 106 communicating with more than one client machine 102, while another embodiment includes a single client machine 102 communicating with a single server 106.

A client machine 102 within the computing environment may in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106 in some embodiments may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment 101 with an application that is any of either server-based or remote-based, and an application that is executed on the server 106 on behalf of the client machine 102. Further embodiments of the computing environment 101 include a server 106 configured to display output graphical data to a client machine 102 using a thin-client or remote-display protocol, where the protocol used can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

In one embodiment, the client machine 102 can be a virtual machine 102C such as those manufactured by XenSolutions, Citrix Systems, IBM, VMware, or any other virtual machine able to implement the methods and systems described herein.

The computing environment 101 can, in some embodiments, include more than one server 106A-106N where the servers 106A-106N are: grouped together as a single server 106 entity, logically-grouped together in a server farm 106; geographically dispersed and logically grouped together in a server farm 106, located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity or in other embodiments may include multiple server farms 106. The computing environment 101 can include more than one server 106A-106N grouped together in a single server farm 106 where the server farm 106 is heterogeneous such that one server 106A-106N is configured to operate according to a first type of operating system platform (e.g., WINDOWS NT, manufactured by Microsoft Corp. of Redmond, Wash.), while one or more other servers 106A-106N are configured to operate according to a second type of operating system platform (e.g., Unix or Linux); more than one server 106A-106N is configured to operate according to a first type of operating system platform (e.g., WINDOWS NT), while another server 106A-106N is configured to operate according to a second type of operating system platform (e.g., Unix or Linux); or more than one server 106A-106N is configured to operate according to a first type of operating system platform (e.g., WINDOWS NT) while more than one of the other servers 106A-106N are configured to operate according to a second type of operating system platform (e.g., Unix or Linux).

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server. Embodiments of the computing environment 101 where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a server 106 with the following functionality: a first server 106A that receives requests from a client machine 102, forwards the request to a second server 106B, and responds to the request generated by the client machine with a response from the second server 106B; acquires an enumeration of applications available to the client machines 102 and address information associated with a server 106 hosting an application identified by the enumeration of applications; presents responses to client requests using a web interface; communicates directly with the client 102 to provide the client 102 with access to an identified application; receives output data, such as display data, generated by an execution of an identified application on the server 106.

The server 106 can be configured to execute any one of the following applications: an application providing a thin-client computing or a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 configured to execute an application so that the server may function as an application server such as any one of the following application server types: an email server that provides email services such as MICROSOFT EXCHANGE manufactured by the Microsoft Corporation; a web or Internet server; a desktop sharing server; or a collaboration server. Still other embodiments include a server 106 that executes an application that is any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

In one embodiment, the server 106 may be a virtual machine 106B such as those manufactured by Citrix Systems, IBM, VMware, or any other virtual machine able to implement the methods and systems described herein.

Client machines 102 may function, in some embodiments, as a client node seeking access to resources provided by a server 106, or as a server 106 providing other clients 102A-102N with access to hosted resources. One embodiment of the computing environment 101 includes a server 106 that provides the functionality of a master node. Communication between the client machine 102 and either a server 106 or servers 106A-106N can be established via any of the following methods: direct communication between a client machine 102 and a server 106A-106N in a server farm 106; a client machine 102 that uses a program neighborhood application to communicate with a server 106a-106n in a server farm 106; or a client machine 102 that uses a network 104 to communicate with a server 106A-106N in a server farm 106. One embodiment of the computing environment 101 includes a client machine 102 that uses a network 104 to request that applications hosted by a server 106A-106N in a server farm 106 execute, and uses the network 104 to receive from the server 106A-106N graphical display output representative of the application execution. In other embodiments, a master node provides the functionality required to identify and provide address information associated with a server 106 hosting a requested application. Still other embodiments include a master node that can be any one of the following: a server 106A-106N within the server farm 106; a remote computing machine connected to the server farm 106 but not included within the server farm 106; a remote computing machine connected to a client 102 but not included within a group of client machines 102; or a client machine 102.

The network 104 between the client machine 102 and the server 106 is a connection over which data is transferred between the client machine 102 and the server 106. Although the illustration in FIG. 1A depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network 104 comprised of multiple sub-networks 104' located between the client machines 102 and the servers 106; a primary public network 104 with a private sub-network 104'; a primary private network 104 with a public sub-network 104'; or a primary private network 104 with a private sub-network 104'. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

Figure 1B:
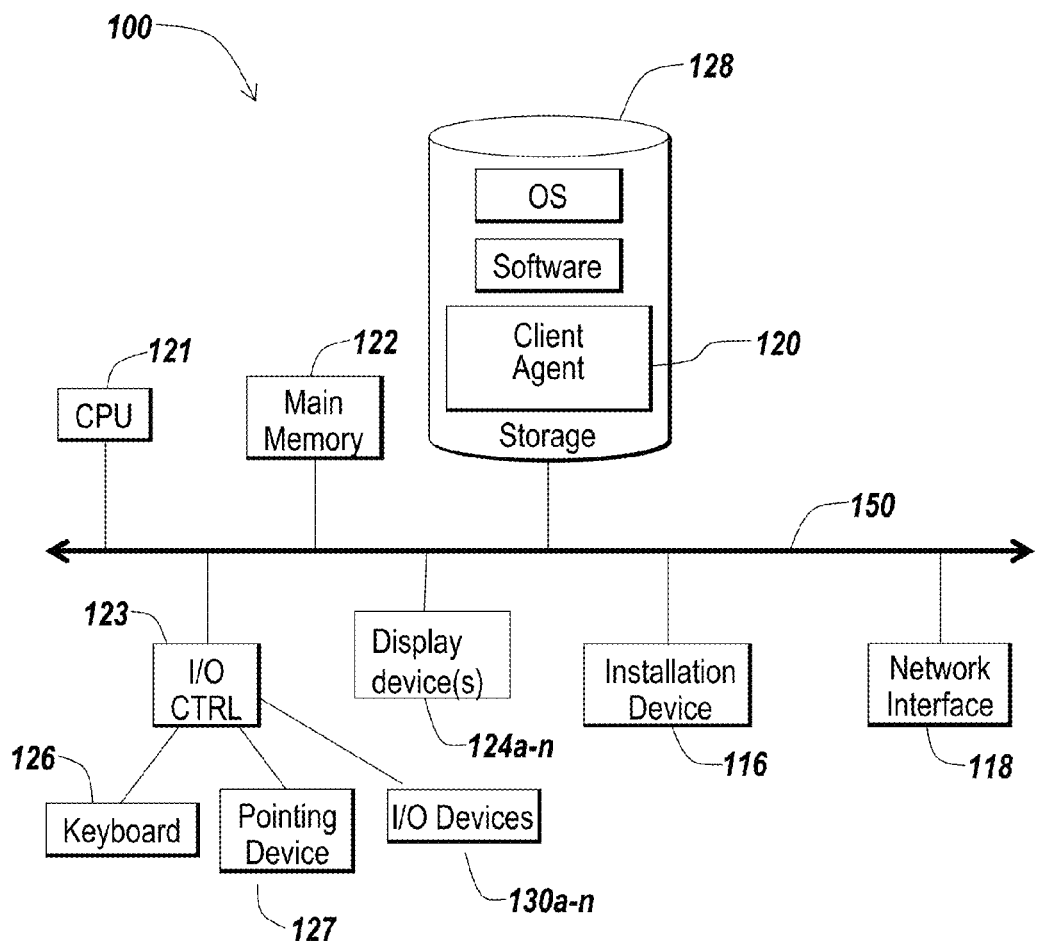
FIGS. 1B-1C depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
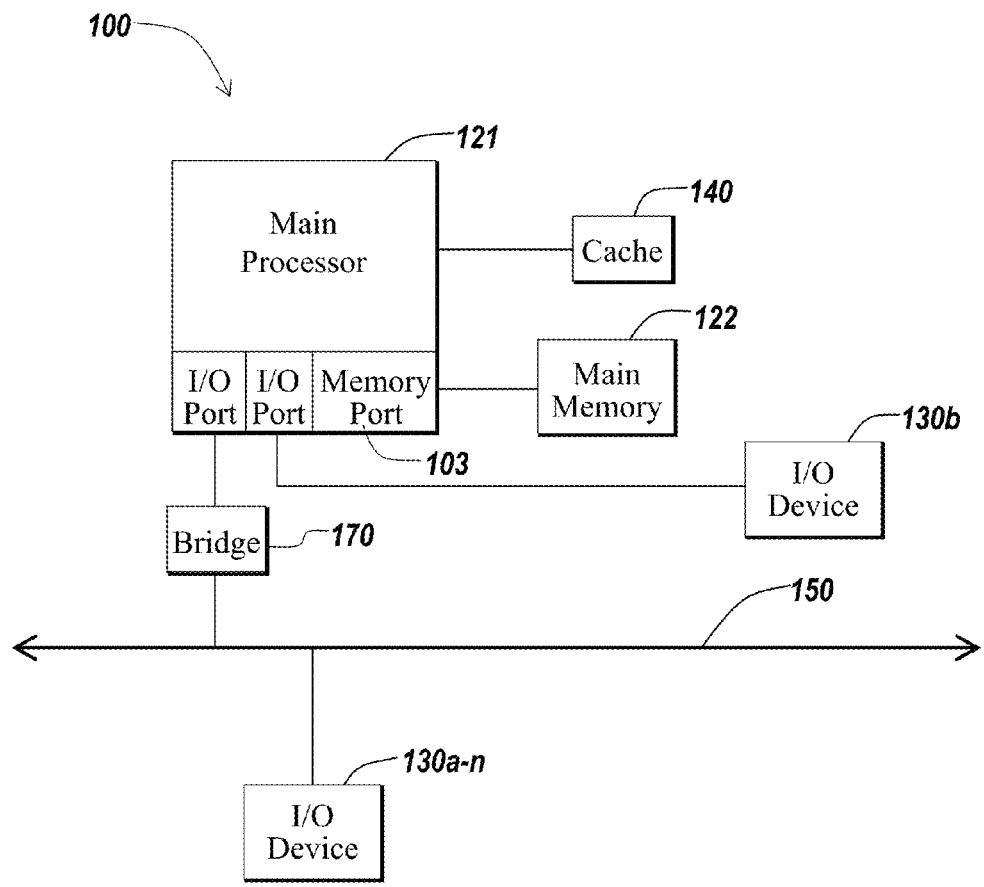

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other embodiments of the central processing unit 122 may include any combination of the following: a microprocessor, a microcontroller, a central processing unit with a single processing core, a central processing unit with two processing cores, or a central processing unit with more than one processing cores.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O devices 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121 via an Advanced Graphics Port (AGP). Still other versions of the computing machine 100 include a processor 121 connected to an I/O device 130A-130N via any one of the following connections: HyperTransport, Rapid I/O, or InfiniBand. Further embodiments of the computing machine 100 include a communication connection where the processor 121 communicates with one I/O device 130A using a local interconnect bus and with a second I/O device 130B using a direct connection.

Included within some embodiments of the computing device 100 is each of a main memory unit 122 and cache memory 140. The cache memory 140 will in some embodiments be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein. The main memory unit 122 and/or the cache memory 140 can in some embodiments include one or more memory devices capable of storing data and allowing any storage location to be directly accessed by the central processing unit 121. Further embodiments include a central processing unit 121 that can access the main memory 122 via one of either: a system bus 150; a memory port 103; or any other connection, bus or port that allows the processor 121 to access memory 122.

One embodiment of the computing device 100 provides support for any one of the following installation devices 116: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a harddrive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments of an I/O device 130 may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a Fibre-Channel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124a-124n. The computing device 100 may in some embodiments be configured to use one or multiple display devices 124A-124N, these configurations include: having multiple connectors to interface to multiple display devices 124a-124n; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments of the computing machine 100, an operating system may be included to control task scheduling and access to system resources. Embodiments of the computing device 100 can run any one of the following operation systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system capable of running on the computing device and performing the operations described herein. One embodiment of the computing machine 100 has multiple operating systems installed thereon.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. Still other embodiments of the computing environment 101 include a mobile computing device 100 that can be any one of the following: any one series of Blackberry, or other handheld device manufactured by Research In Motion Limited; the iPhone manufactured by Apple Computer; any handheld or smart phone; a Pocket PC; a Pocket PC Phone; or any other handheld mobile device supporting Microsoft Windows Mobile Software.

Figure 1D:
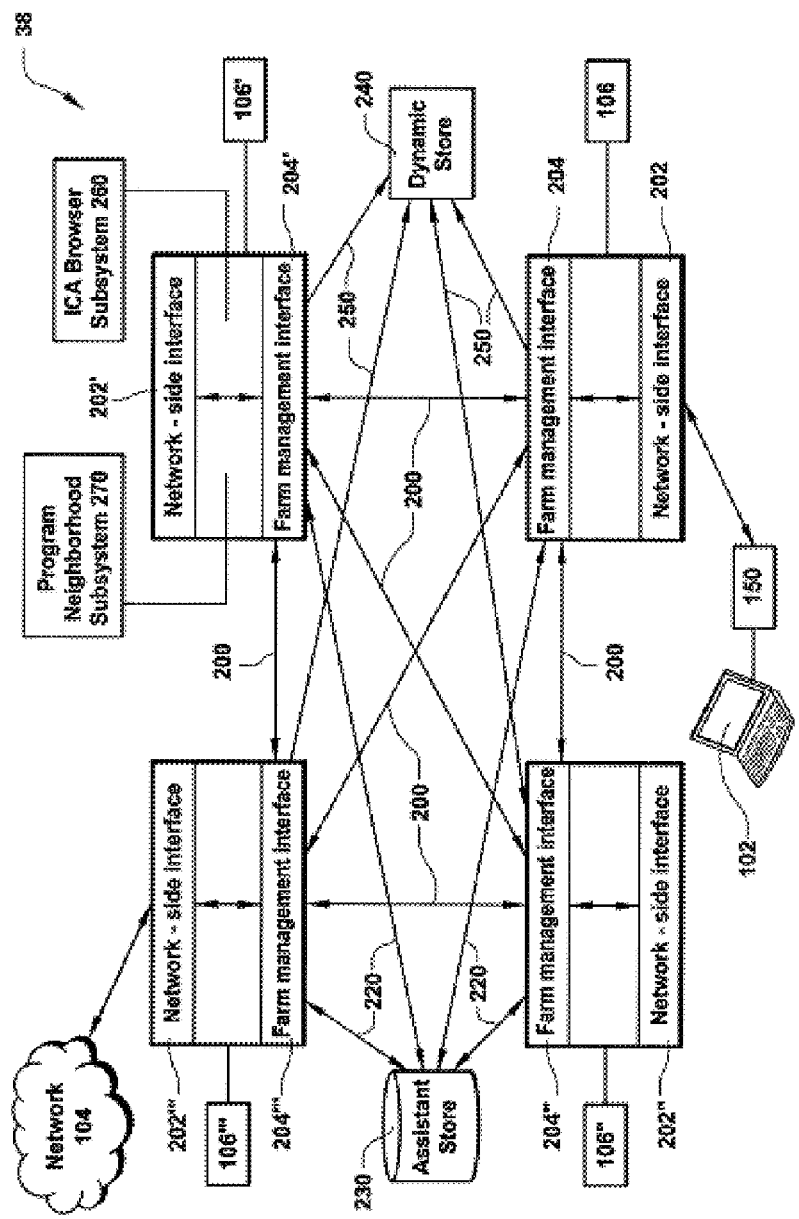
FIG. 1D illustrates a block diagram depicting an embodiment of a server farm.

Referring now to FIG. 1D, together the servers 106 comprise a farm 38 or server farm, where each server 106 can include a network-side interface 202 and a farm-side interface 204. The network-side interface 202 can be in communication with one or more clients 102 or a network 104. The network 104 can be a WAN, LAN, or any other embodiment of a network such those networks described above.

Each server 106 has a farm-side interface 204 connected with one or more farm-side interface(s) 204 of other servers 106 in the farm 38. In one embodiment, each farm-side interface 204 is interconnected to other farm-side interfaces 204 such that the servers 106 within the farm 38 may communicate with one another. On each server 106, the farm-side interface 204 communicates with the network-side interface 202. The farm-side interfaces 204 can also communicate (designated by arrows 220) with a persistent store 230 and, in some embodiments, with a dynamic store 240. The combination of servers 106, the persistent store 230, and the dynamic store 240, when provided, are collectively referred to as a farm 38. In some embodiments, a server 106 communicates with the persistent store 230 and other servers 106' communicate with the server 106 to access information stored in the persistent store.

The persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one farm 38. The persistent store 230 maintains static data associated with each server 106 in farm 38 and global data used by all servers 106 within the farm 38. In one embodiment, the persistent store 230 may maintain the server data in a Lightweight Directory Access Protocol (LDAP) data model. In other embodiments, the persistent store 230 stores server data in an ODBC-compliant database. For the purposes of this description, the term "static data" refers to data that does not change frequently, i.e., data that changes only on an hourly, daily, or weekly basis, or data that never changes. Each server uses a persistent storage subsystem to read data from and write data to the persistent store 230.

The data stored by the persistent store 230 may be replicated for reliability purposes either physically or logically. For example, physical redundancy may be provided using a set of redundant, mirrored disks, each providing a copy of the data. In other embodiments, the database itself may be replicated using standard database techniques to provide multiple copies of the database. In further embodiments, both physical and logical replication may be used concurrently.

The dynamic store 240 (i.e., the collection of all record tables) can be embodied in various ways. In one embodiment, the dynamic store 240 is centralized; that is, all runtime data are stored in the memory of one server 106 in the farm 38. That server operates as a master network node with which all other servers 106 in the farm 38 communicate when seeking access to that runtime data. In another embodiment, each server 106 in the farm 38 keeps a full copy of the dynamic store 240. Here, each server 106 communicates with every other server 106 to keep its copy of the dynamic store 240 up to date.

In another embodiment, each server 106 maintains its own runtime data and communicates with other servers 106 when seeking to obtain runtime data from them. Thus, for example, a server 106 attempting to find an application program requested by the client 102 may communicate directly with every other server 106 in the farm 38 to find one or more servers hosting the requested application.

For farms 38 having a large number of servers 106, the network traffic produced by these embodiments can become heavy. One embodiment alleviates heavy network traffic by designating a subset of the servers 106 in a farm 38, typically two or more, as "collector points." Generally, a collector point is a server that collects run-time data. Each collector point stores runtime data collected from certain other servers 106 in the farm 38. Each server 106 in the farm 38 is capable of operating as, and consequently is capable of being designated as, a collector point. In one embodiment, each collector point stores a copy of the entire dynamic store 240. In another embodiment, each collector point stores a portion of the dynamic store 240, i.e., it maintains runtime data of a particular data type. The type of data stored by a server 106 may be predetermined according to one or more criteria. For example, servers 106 may store different types of data based on their boot order. Alternatively, the type of data stored by a server 106 may be configured by an administrator using an administration tool (Not Shown.) In these embodiments, the dynamic store 240 is distributed amongst two or more servers 106 in the farm 38.

Servers 106 not designated as collector points know the servers 106 in a farm 38 that are designated as collector points. A server 180 not designated as a collector point may communicate with a particular collector point when delivering and requesting runtime data. Consequently, collector points lighten network traffic because each server 106 in the farm 38 communicates with a single collector point server 106, rather than with every other server 106, when seeking to access the runtime data.

Each server 106 can operate as a collector point for more than one type of data. For example, server 106" can operate as a collector point for licensing information and for loading information. In these embodiments, each collector point may amass a different type of run-time data. For example, to illustrate this case, the server 106''' can collect licensing information, while the server 106" collects loading information.

In some embodiments, each collector point stores data that is shared between all servers 106 in a farm 38. In these embodiments, each collector point of a particular type of data exchanges the data collected by that collector point with every other collector point for that type of data in the farm 38. Thus, upon completion of the exchange of such data, each collector point 106" and 106 possesses the same data. Also in these embodiments, each collector point 106 and 106" also keeps every other collector point abreast of any updates to the runtime data.

Browsing enables a client 102 to view farms 38, servers 106, and applications in the farms 38 and to access available information such as sessions throughout the farm 38. Each server 106 includes an ICA browsing subsystem 260 to provide the client 102 with browsing capability. After the client 102 establishes a connection with the ICA browser subsystem 260 of any of the servers 106, that browser subsystem supports a variety of client requests. Such client requests include: (1) enumerating names of servers in the farm, (2) enumerating names of applications published in the farm, (3) resolving a server name and/or application name to a server address that is useful the client 102. The ICA browser subsystem 260 also supports requests made by clients 10 running a program neighborhood application that provides the client 102, upon request, with a view of those applications within the farm 38 for which the user is authorized. The ICA browser subsystem 260 forwards all of the above-mentioned client requests to the appropriate subsystem in the server 106.

In one embodiment, each server 106 in the farm 38 that has a program neighborhood subsystem 270 can provide the user of a client 102 with a view of applications within the farm 38. The program neighborhood subsystem 270 may limit the view to those applications for which the user of the client 102 has authorization to access. Typically, this program neighborhood service presents the applications to the user as a list or a group of icons.

The functionality provided by the program neighborhood subsystem 270 can be available to two types of clients, (1) program neighborhood-enabled clients that can access the functionality directly from a client desktop, and (2) non-program neighborhood-enabled clients (e.g., legacy clients) that can access the functionality by running a program neighborhood-enabled desktop on the server.

Communication between a program neighborhood-enabled client and the program neighborhood subsystem 270 may occur over a dedicated virtual channel that is established on top of an ICA virtual channel. In other embodiments, the communication occurs using an XML service. In one of these embodiments, the program neighborhood-enabled client communicates with an XML subsystem, such as the XML service 516 described in connection with FIG. 6 below, providing program neighborhood functionality on a server 106.

In one embodiment, the program neighborhood-enabled client does not have a connection with the server with a program neighborhood subsystem 270. For this embodiment, the client 102 sends a request to the ICA browser subsystem 260 to establish an ICA connection to the server 106 in order to identify applications available to the client 102. The client 102 then runs a client-side dialog that acquires the credentials of a user. The credentials are received by the ICA browser subsystem 260 and sent to the program neighborhood subsystem 270. In one embodiment, the program neighborhood subsystem 270 sends the credentials to a user management subsystem for authentication. The user management subsystem may return a set of distinguished names representing the list of accounts to which the user belongs. Upon authentication, the program neighborhood subsystem 270 establishes the program neighborhood virtual channel. This channel remains open until the application filtering is complete.

The program neighborhood subsystem 270 then requests the program neighborhood information from the common application subsystem 524 associated with those accounts. The common application subsystem 524 obtains the program neighborhood information from the persistent store 230. On receiving the program neighborhood information, the program neighborhood subsystem 270 formats and returns the program neighborhood information to the client over the program neighborhood virtual channel. Then the partial ICA connection is closed.

For another example in which the program neighborhood-enabled client establishes a partial ICA connection with a server, consider the user of the client 102 who selects a farm 38. The selection of the farm 38 sends a request from the client 102 to the ICA browser subsystem 260 to establish an ICA connection with one of the servers 106 in the selected farm 38. The ICA browser subsystem 260 sends the request to the program neighborhood subsystem 270, which selects a server 106 in the farm 38. Address information associated with the server 106 is identified and returned to the client 102 by way of the ICA browser subsystem 260. The client 102 can then subsequently connect to the server 106 corresponding to the received address information.

In another embodiment, the program neighborhood-enabled client 102 establishes an ICA connection upon which the program neighborhood-virtual channel is established and remains open for as long as the ICA connection persists. Over this program neighborhood virtual channel, the program neighborhood subsystem 270 pushes program neighborhood information updates to the client 102. To obtain updates, the program neighborhood subsystem 270 subscribes to events from the common application subsystem 524 to allow the program neighborhood subsystem 270 to detect changes to published applications.

Figure 2:
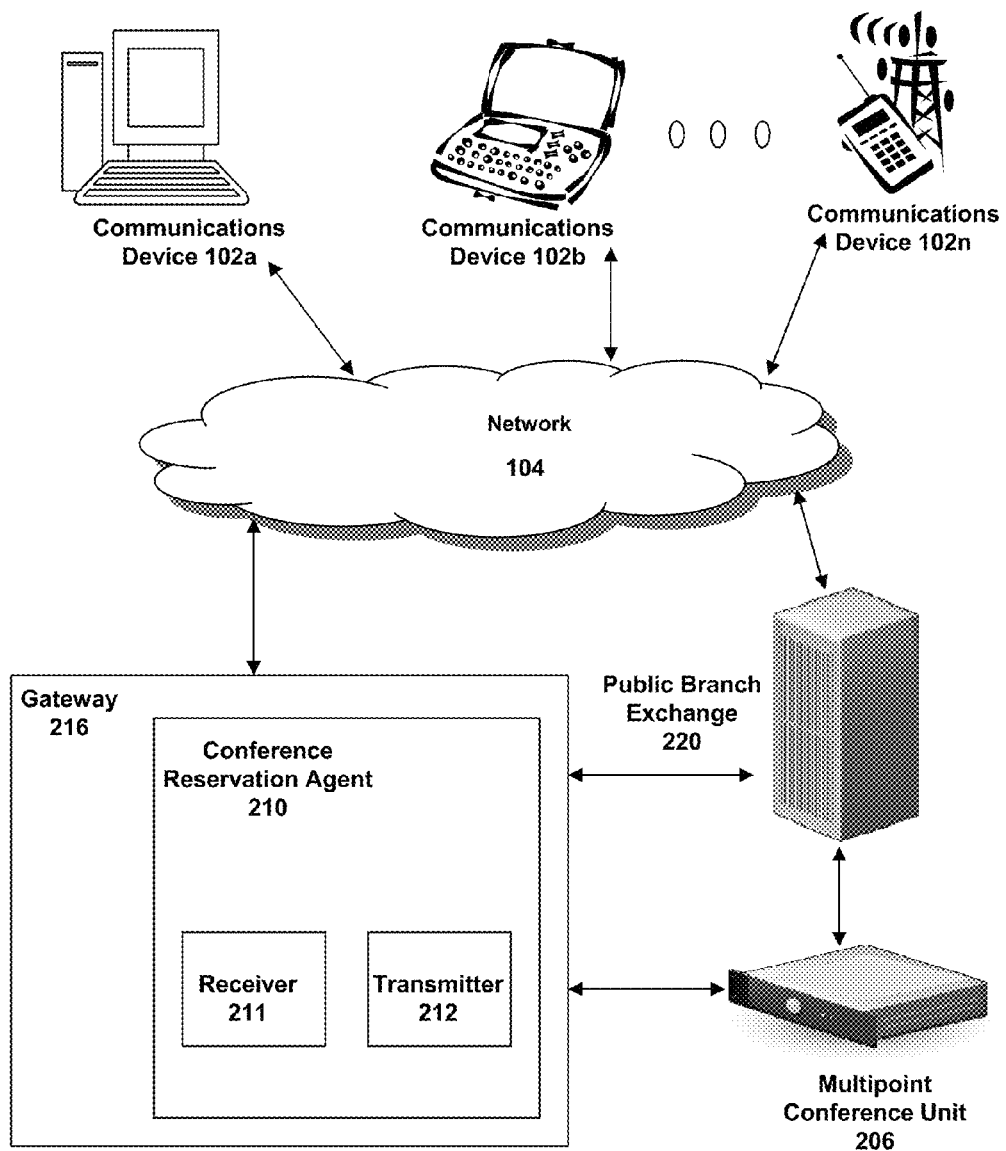
FIG. 2 depicts a block diagram of one embodiment of a system for establishing a conference call.

Referring now to FIG. 2, a block diagram depicts an embodiment of a conference call system for establishing, via an out-bound call to a user, a conference call bridge between participants in a conference call. In brief overview, the system can include a conference reservation agent 210 executing within a gateway 216. The conference reservation agent 210 can comprise a receiver 211 and a transmitter 212 and can further comprise a user database that stores conference call information for users of the system. The gateway 216 can communicate with at least one multiport conference unit 206 and at least on public branch exchange 220. Each of the gateway 216 and the public branch exchange 220 can communicate via a network 104 and with a plurality of communications devices 102a-n (hereafter referred to generally as communications devices 102.) In one embodiment, the conference reservation agent 210 is provided by a gateway 216 and receives information associated with a communications device 102 of a conference call participant. The at least one multiport conference unit 206a-n (hereafter referred to generally as a multiport conference unit 206) can establish an audio communications session between the communications device 102 and a conference bridge, responsive to the received information.

Further referring to FIG. 2, and in greater detail, in one embodiment, the system includes a network 104 which may be any network 104. In other embodiments, the network 104 can be any network 104 described herein. The network 104, in some embodiments, can be a telecommunications network comprising copper or aluminum wiring. In other embodiments, the network 104 can comprise an network that carries voice or audio data from a starting location to a telephone exchange and then to a destination location. In one embodiment, the network 104 can be a wireless network; a public switched telephone network; a public land mobile network; a packet switched network; a mobile network; a circuit switched network; or any other network able to carry an audio or voice signal or data.

In some embodiments, the system can include a single communications device 102, while in other embodiments the system can include more than one communications device 102. The communications device(s) 102, in some embodiments, can communicate via a network installed between each communications device 102. In another embodiment the communications device(s) 102 can communicate with a gateway 216 via the network 104.

In one embodiment, a communications device 102 executes software to render a graphical user interface provided by the conference reservation agent 210. In another embodiment, a communications device 102 executes software to render a page written in a mark-up language. In still another embodiment, a communications device 102 executes a web browser. In yet another embodiment, a communications device 102 executes a Virtual Private Network (VPN) client application. In some embodiments, the gateway 216 can provide VPN access to a private network 104, while in other embodiments the gateway 216 can work in conjunction with another computing device to provide the communications device or other devices and/or computing machines with VPN access to a private network 104.

The communications device 102 can be any communications device and in some embodiments, can be any communications device 102 described herein. In some embodiments, the communications device 102 can be a cell phone, telephone or any other telecommunication device. In other embodiments, the communications device 102 can be a computing machine executing an application or client that when executing on the computing machine, can establish a telecommunication connection using voice over IP. This application or client can be any of the following applications or programs: Skype®; Brosix; Cisco® IP Communicator; Windows Messenger; Yahoo Messenger; GMAIL Chat; Vonage®; and any other internet telephony service or any other program, client or application for establishing a telecommunication connection using voice over IP. In one embodiment, the communications device 102 provides functionality for establishing a communications session, such as a telephone call, a chat session, an e-mail session, an internet session, or other communications session. In another embodiment, the communications device 102 provides the user of the communications device 102 with functionality allowing a user to select a telephone number from a list of telephone numbers provided, for example, by an interface of the conference reservation agent 210. In still another embodiment, the user can edit the telephone number or enter a new telephone number prior to submitting in a response. In still even another embodiment, the user can perform directory traversal to locate numbers that are not located in the interface, but instead are stored in one or more heterogeneous or homogenous directory services (e.g., MICROSOFT OUTLOOK contacts and other directory sources). In yet another embodiment, the telephone number may be a traditional landline number, wireless mobile number, TTY number, SKYPE (or other internet telephony service) identification number or any other number associated with a communications device 102 supporting audio communications.

A gateway 216 may be any computing machine. In one embodiment, the gateway 216 can be any computing machine or device described herein. In another embodiment, the gateway 216 can be a server 106, while in other embodiments the gateway 216 can be any computing machine that further comprises one or more multiport conference unit 206. In still another embodiment, as shown in FIG. 2, the gateway 216 is connected to or in communication with the one or more multiport conference unit(s) 206. The gateway 216, in yet another embodiment, is a multiport conference unit 206. In yet another embodiment, the gateway 216 is connected to or in communication with a Public Branch Exchange (PBX) 220.

The gateway 216, in some embodiments, communicates with one or more communications device(s) 102 using a network 104 installed between the gateway 216 and the communications device(s) 102. The gateway 216 can also use this network 104 to communicate with a PBX 220 and/or one or more multiport conference unit(s) 206. In some embodiments, the gateway 216 can be a gateway device 216 comprising at least a processor and memory for executing applications on the gateway device 216. The conference reservation agent 210, in some embodiments, can execute on the gateway device 216.

In some embodiments the gateway device 216 can receive the conference call information from call participants prior to initiating a conference call. The conference call information can comprise any of the following types of information: an identifier for the conference call participant such as a user ID or serial number associated with that participant; a phone number specified by the conference participant; a GoToMeeting identifier that can be used to initiate a web-based meeting; the type of communication device used by the call participant; a default phone number; and any other relevant call information. When the conference call participants enter conference call information into a web-form supplied to the conference call participants by the gateway device 216, the conference call information entered by the participants is returned to the gateway device 216. In one embodiment the conference call information is sent as HTML-formatted data using a HTTP protocol, in other embodiments the conference call information is sent as XML-formatted data using a SOAP protocol. In some embodiments, the gateway device 216 can store the conference call information in a database, table or other storage repository on the gateway 216. In other embodiments, the gateway device 216 can format the conference call information before storing or using the call information. Such formatting can include parsing the call information to remove extraneous symbols such as "-" or "." and/or parsing the call information to remove extra spaces. The formatting can further include concatenating call information supplied by a conference call participants and a conference call identifier, passcode or conference call participant identifier. The gateway 216, in some embodiments, can receive conference call information via a receiver 211 executing within the conference reservation agent 210 executing on the gateway 216. In other embodiments, the gateway 216 can issue web-forms and other requests for conference call information via a transmitter 212 executing within the conference call reservation agent 210 which is executing on the gateway 216.

In one embodiment, the conference reservation agent 210 can be any application, program, or client, agent executing on the gateway 216. In some embodiments, the conference reservation agent 210 can be any application used to initiate a conference call, call conference call participants, verify the identity of conference call participants, and/or establish a conference call bridge between at least one multiport conference unit 206 and the communications devices 102 for each conference call participant. The conference reservation agent 210 can be referred to as the conference call reservation agent 210, the conference call system, or the reservation agent 210. A user can interact with the conference reservation agent 210 via a user interface. The user interface, in some embodiments, can be displayed within an application such as Citrix's GOTOMEETING, MICROSOFT OUTLOOK, or Cisco's CLICK TO CALL. In other embodiments, the user interface can be displayed within a web browser, or interactive web page. In still other embodiments, the user interface can be displayed by a thin-client sending the application output of the conference reservation agent 210 to a computing device located in a location remote from the location of the gateway device 216.

In one embodiment, the conference reservation agent 210 receives a user's request to create a conference call and responsively establishes a conference. Establishing a conference, in some embodiments, can include obtaining a list of conference call participants including any of the following information: an email address for each conference call participant; a conference call participant identifier; a default phone number for each conference call participant; a contact address for each conference call participant, where the contact address can be a phone number used to send a SMS message; and a preferred conference call phone number. In some embodiments, the conference reservation agent 210 can interface with an active directory that stores the phone numbers and other contact information for the conference call participants. In still other embodiments, the conference reservation agent 210 can interface with a database, directory, comma delimited file, list or other storage repository or file containing call information for the conference call participants. The conference reservation agent 210 can retrieve information from the active directory, storage repository or file and use the retrieved information to contact conference call participants. In some embodiments, a user's request to establish a conference can include a listing of each conference call participant and that participant's contact information. In other embodiments, the conference reservation agent 210 can receive a group name for the participants, or a list of the conference call participants.

In some embodiments, the conference reservation agent 210 can use the contact information for each conference call participant to email the conference call participants a link which, when clicked, causes the conference reservation agent 210 to send the conference call participant a form requesting the conference call participant to enter a phone number or other contact number. The conference reservation agent 210 generates a user interface that includes a field for entering a phone number. Participants can enter their phone number and submit the form which causes the entered number to be sent to the conference reservation agent 210.

In still even another embodiment, the conference reservation agent 210 provides a web-based interface to support conference call reservations. In yet another embodiment, the conference reservation agent 210 includes a receiver receiving, from a conference call participant, via a page written in a markup language, information associated with a communications device of the conference call participant and a conference call identifier. In some embodiments, the conference reservation agent 210 includes a transmitter for sending a page written in a markup language to a communications device 102. In one of these embodiments, the conference reservation agent 210 provides the page written in a markup language over the Internet. While in some embodiments the page is written in a markup language such as HTML or XML, in other embodiments the page can be generated by a script or applet such as a Java applet, or by a control such as an ActiveX control. In another of these embodiments, the conference reservation agent 210 provides the page over a network connection between the gateway 216 and a communications device 102. In still another of these embodiments, the conference reservation agent 210 is in communication with a web server. For example, the gateway 216 may include a web server transmitting data to communications devices 102. In some embodiments, the conference reservation agent 210 sends an invitation to a computer associated with a participant. In other embodiments, the conference reservation agent 210 includes a receiver to receive reservation information from the user, provided via the interface and from the communications device 102.

In one embodiment, the conference reservation agent 210 provides an interface including an interface element allowing a user to enter contact information of a communications device 102 associated with the user. In another embodiment, the contact information entered may be one or more of an email address or an address of a communications device 102 capable of receiving a message comprising a page written in a mark-up language, such as via email, SMS, MMS and web pages. In still another embodiment, the contact information is applied in sending an invitation to each of the identified participants associated with the conference session. In yet another embodiment, the contact information is a telephone number of a communications device 102.

In one embodiment, the conference reservation agent 210 provides an interface element that displays to the conference call participant, a status of a conference call. In another embodiment, the conference reservation agent 210 provides an interface element displaying, via a page written in a markup language, to the conference call participant, a conference call control interface. In still another embodiment, the conference reservation agent 210 provides the interface element displaying the conference status during a conference session. In yet another embodiment, conference reservation agent 210 provides the interface element displaying the conference call control interface only during a conference session. In some embodiments, the conference reservation agent 210 includes a transmitter sending the interface element to the display unit of a communications device 102 associated with the participant.

In one embodiment, a conference call control interface allows a participant, such as a participant chairing a conference call, to control aspects of the conference session. These include controls may include interface elements for blocking audio input from other participants, adjusting the audio volume of particular participants and pausing or terminating the conference session. In another embodiment, the displayed conference status may provide information such as how many and which participants are connected to the conference session, and who is speaking at a particular moment. In still another embodiment, the conference reservation agent 210 may provide additional administrative and conference management and reservation functions via the interface element.

In some embodiments, executing within the conference reservation agent 210 can be a receiver 211 that can receive information transmitted to the gateway 216 and destined for the conference reservation agent 210. The receiver 211 can receive call information, email addresses, access codes, communication device configurations and preferences and other conference call information for the conference call participants. The receiver 211 can receive conference call information from multiple conference call participants. In one embodiment, the receiver 211 can be an application or program executing within the conference reservation agent 210. This application can act like a communications module in that the receiver 211 can interface with other applications seeking to send information to the conference reservation agent 210. In other embodiments, the receiver 211 can be hardware included within the gateway 216 and able to receive network traffic, i.e. data packets, and forward the data within the data packets to the conference reservation agent 210.

Similarly, in one embodiment the conference reservation agent 210 executes a transmitter 212 that transmits information to applications and programs interfacing with the conference reservation agent 210. The transmitter 212 can transmit conference call information to conference call participants, and a conference call URL to conference call participants. The conference call URL, in some embodiments, is a link to a page that includes a web-form designed to receive conference call information from conference call participants. Therefore the URL, in some embodiments, can be the address of this page or the address of a page executing an applet or script that can generate page that includes the described web-form. In some embodiments, the transmitter 212 can transmit conference call phone numbers to the one or more multiport conference unit(s) 206. In one embodiment, the transmitter 212 can be an application or program executing within the conference reservation agent 210. This application can act like a communications module in that the transmitter 212 can interface with other applications requesting information from the conference reservation agent 210. In other embodiments, the transmitter 212 can be hardware included within the gateway 216 and able to transmit data packets from the conference reservation agent 210 to applications and devices within the conference call system.

In one embodiment, the gateway 216 is in communication with at least one multiport conference unit 206. Although FIG. 2 illustrates a single multiport conference unit 206, the gateway 216 can be connected to and/or communicate with multiple multiport conference units 206. The multiport conference unit 206, in some embodiments, is a device in communication with both the gateway 216 and a public switched telephone network. The multiport conference unit 206 can call conference participants and bridge each call or call leg to combine the signals and form a single signal over which participants can communicate with one another. Thus, the multiport conference unit 206 can logically combine multiple telecommunication signals by receiving voice data from telecommunication endpoints, e.g. the communications device(s) 102, and forwarding that voice data to endpoints corresponding to each conference participant, e.g. the communications device(s) 102 of each conference call participant. Combining the telecommunication signals in this manner can be referred to a call bridging and can be used to establish a conference call. The gateway 216, in some embodiments, can forward the multiport conference unit(s) 206 phone numbers which the multiport conference unit(s) 206 can use to call each conference participant. When the multiport conference unit 206 establishes a connection with a conference call participant, that connection can be referred to as a call leg. Thus, in a conference call having six conference call participants, there are six call legs. The multiport conference unit 206 bridges these six calls into a single conference call by combining each of the six call legs into a single connection or call leg.

Once the multiport conference unit 206 combines the multiple call legs or conference call connections into a single connection, the multiport conference unit 206 can forward the call signal to a public branch exchange 220 or private branch exchange (not shown) which eventually broadcasts the combined signal out to the conference call participants. Therefore, the multiport conference unit 206 can receive from the public branch exchange 220 one or more call legs or conference call connections or signals, combine the multiple signals into a single signal, and transmit that single signal to the conference call participants via the public branch exchange 220. Thus, in one embodiment the multiport conference unit 206 is a switch that receives multiple inputs and outputs a single signal, or a switch that receives multiple inputs and outputs a uniform signal over multiple connections. In still other embodiments, the multiport conference unit 206 does not combine call legs, but rather forwards voice data according to the conference configuration. For example, the multiport conference unit 206 can receive voice data from any of the conference participants. When the multiport conference unit 206 receives voice data, the multiport conference unit 206 broadcasts or otherwise distributes an exact copy of that voice data to each of the conference participants. This voice data is carried by a public branch exchange 220 to the communications devices of each of the conference participants. In some embodiments, the number of conference participants, and therefore call legs, managed by the multiport conference unit can number at least two, while in other embodiments the number can exceed two. In at least one embodiment, the multiport conference unit 206 has a maximum number of call legs that the multiport conference unit 206 can handle. Upon reaching this maximum, the multiport conference unit 206 refuses to establish any new conference call communication connections.

In some embodiments, the gateway 216 is in communication with a public branch exchange (PBX) 220, via a multiport conference unit 206. In one of these embodiments, the PBX 220 is a business telephone system. In another of these embodiments, the PBX 220 is in communication with one or more of the mobile, packet switched and circuit switched networks provided by network 104. In still another of these embodiments, the gateway 216 and the PBX 220 communicate with each other via a second network 104' (not shown). In other embodiments, a business telephone system connects the multiport conference unit 206 with the communications device 102. In one of these embodiments, out-bound calls from the business telephone system are cost-managed, for example, by using a telephone service with reduced-rates. In some embodiments, the multiport conference units 206 interface with the PBX 220 using a telecommunication switching system.

Figure 3A:
FIGS. 3A-3D depict screen shots of an embodiment of a system for setting up a conference.

FIG. 3A illustrates an embodiment of a user interface displayed during the creation of a conference call using the conference call system described herein. In brief overview, the screenshot depicts a dialog box displayed to a user when the user requests to create a conference call. This request can be intercepted by the conference reservation agent 210 which can then generate a web form that prompts a user to enter a personal identification number (PIN) that designates them as a chairperson. Clicking on the "Continue" button can allow the user to proceed to the next step for establishing the conference call.

Referring to FIG. 3A, and in greater detail, in one embodiment the conference reservation agent 210 receives a request from a user of a remote computer communicating with the gateway 216 or from a user of the gateway 216 itself to create a conference call. In another embodiment, the conference call system receives a request from a user to initiate a conference, where the conference call system can comprise at least the conference reservation agent 210, the gateway 216 and the multiport conference unit 206. Creating a conference call can include scheduling a time for the conference call, choosing the participants of the conference call and designating a chairperson for the conference call. In one embodiment, the user requesting to create the conference call is the chairperson and is designated as the chairperson in the conference call settings. In other embodiments, the chairperson can be designated using the conference reservation agent 210 user interface.

In one embodiment, the window is displayed to the user requesting to establish a conference call. The user can input a chairperson PIN which can comprise any alpha-numeric string. In other embodiments, the PIN can comprise number, letters or symbols. In still other embodiments, the PIN can be a biometric marker associated with the user and gathered via an input device connected to either a client communicating with the gateway 216 or the gateway 216. This biometric marker can be a retinal scan, a fingerprint, a handprint or any other biometric marker specific to the user. In some embodiments, the PIN is an optional element and the user is able to continue to the next screen without creating a PIN.

Figure 3B:
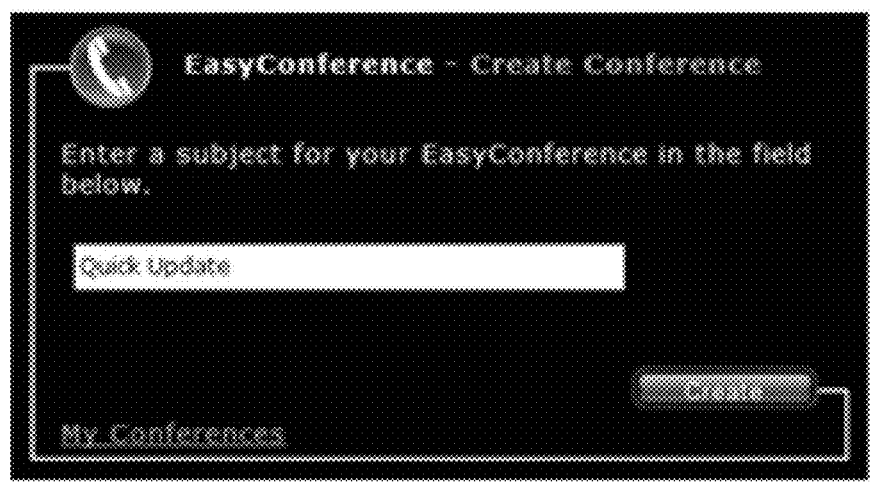

In one embodiment, the user advances from the PIN request screen to subsequent conference call screens by clicking on a "continue button." Illustrated in FIG. 3B is one embodiment of a window displayed to a user after the user initiates creation of a conference. This window, in some embodiments, can request a subject for the conference. While FIG. 3B illustrates a window that requests only a conference subject, in other embodiments, the screen could also request any of the following information: a conference call date; a conference call time; a group of conference call invitees; the names of the conference call participants; the name of a chairperson or additional chairpersons; links to documents to be reviewed during the conference call; a link to a go-to-meeting session to be executed during the conference call; or any other information relevant to the conference call.

In one embodiment, the dialog box prompts the user to enter a title or subject for the conference call. In the text field provided, a user can specify a title for the conference call or create a short summary of the purpose of the conference call. In one embodiment, a link can be included within the window, where the link leads to a listing of other conferences created by the user. Once the user has entered in the conference call information, the user can then click a "Create" button to create the conference. In some embodiments, when the user clicks the "Create" button, the conference reservation agent 210 can update a table, database or list of conference calls with the newly created conference call. In still other embodiments, when the user clicks the "Create" button a conference call identification number or other identifier is assigned to the conference. Upon assigning this number, the conference reservation agent 210 inserts the conference call information into a table, list or other storage repository and associates or otherwise assigns the conference call identifier to the entered conference call information.

Figure 3C:
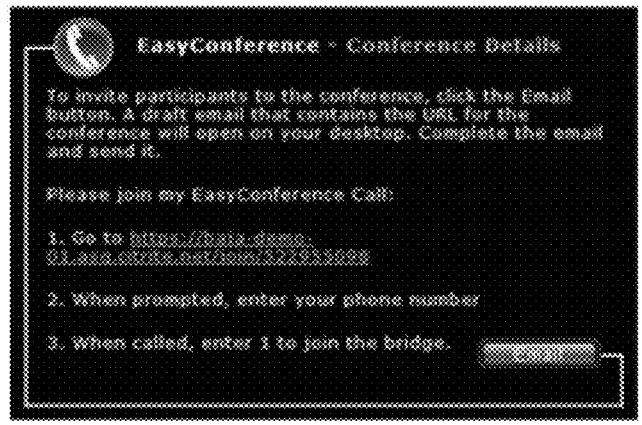

Illustrated in FIG. 3C is a window displayed after the conference call is created by the user. This window can, in some embodiments, illustrate directions for how to email each conference participant a link to the newly created conference. In one embodiment, the window comprises an "Email" button that, when clicked or otherwise activated, sends an email to each conference participant and includes in the email any of the following: instructions for signing onto the conference call; a go-to-meeting meeting ID; a hyperlink to a shared conference and directions for how to enter a phone number into a window or web form that pops up when a user selects the hyperlink; and any other information associated with the conference call.

Referring to FIG. 3C, and in more detail, in one embodiment the window is displayed responsive to creating the conference. In other embodiments, the window can be displayed when the chairperson or requesting user selects users to be included in the conference call.

The URL or link displayed within the window, in some embodiments, is generated by the gateway 216. In one embodiment, the displayed URL is the conference call URL. This URL can include the address of a page to be displayed within the window. In some embodiments, the URL can comprise a conference identifier or other identifier assigned to the conference when the user created the conference and responsive to receiving the request to create the conference.

In one embodiment, the window can display a set of instructions that instruct a user how to send the conference call information to each conference call participant. In other embodiments, the window can display a sample set of instructions that are included in an email sent by the conference reservation agent 210 to each conference call participant. This email, in some embodiments, can include a link to an online webpage, web-form or document. When clicked, the link can open a window and display a web form that includes an input field for inputting conference call information that is specific to each participant. For example, a conference call participant can receive the email and follow the directions to click on the link, and enter a phone number into the web-form that pops up when the link is clicked. Upon entering their phone number, the web-form posts the information entered into the phone number field to the server which retrieves the phone number and stores it in a table, list or other storage repository that stores the conference call information for the established conference call.

In one embodiment, the window can comprise an additional input box within which the user can enter the email addresses of those participants the user wishes to invite to the conference call. In still another embodiment, the input box can include a listing of email addresses or groups managed by an active directory system in communication with the displayed web-form. The user can select email groups and email addresses from the list, so that those persons selected by the user receive the email inviting the user to attend the conference call. In still other embodiments, the user is able to browse and use stored contacts.

Figure 3D:
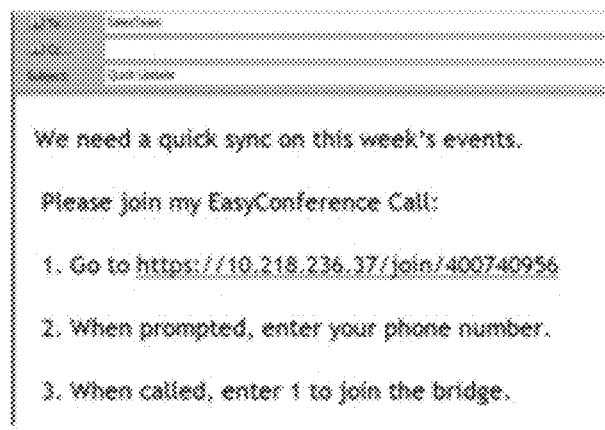

Illustrated in FIG. 3D is a screenshot of an embodiment of an email sent to conference call participants. As illustrated, the email can include instructions for inputting a conference call participant's phone number into the web-form displayed when a participant selects the hyperlink included in the email. In some embodiments, the email can include a subject line that includes the title or subject of the conference call. While the email may be forwarded to each conference call participant by the conference reservation agent 210, the email may be structured such that the email can be forwarded to one or more persons and that by entering their phone number into the web-form, those persons will automatically be included in the conference call. In this embodiment, the user does not have to determine the conference call participants ahead of time, rather, users can subscribe to the conference call by registering their phone number with the conference reservation agent 210.

Figure 4A:
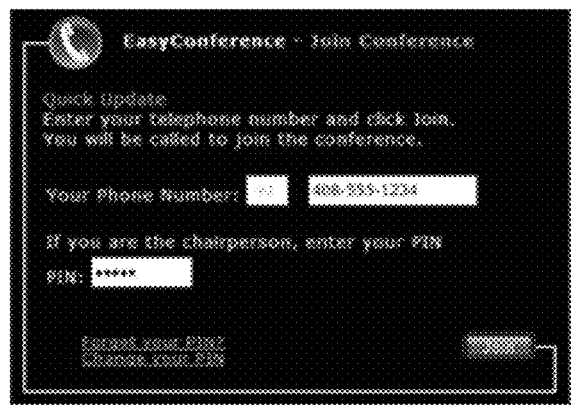
FIGS. 4A-4B depict screen shots of an embodiment of a system for setting up a conference.

Illustrated in FIG. 4A is a window displayed to a conference call participant that requests the conference call participant to enter his/her phone number. The window can include instructions for entering their phone number and clicking the "Join" button. In some embodiments, the window can further comprise an input field where the user can input a PIN or other identifier or access code.

Further referring to FIG. 4A, and in greater detail, in one embodiment the window can comprise a web-form that includes one or more input fields. The input fields, in some embodiments, can be formatted only to accept a particular data type, such as a phone number. In one embodiment, the web-form includes instructions that direct a conference call participant to enter in a phone number or other contact number and click the "Join" button.

When the user clicks the "Join" button, in some embodiments, the phone number can be added to a queue of phone numbers. In one embodiment, the queue of phone numbers is sent to a multiport conference unit 206 which calls each phone number in the queue. In other embodiments, the phone number can be stored in a database or table and can further be linked or otherwise associated with the conference call participant that entered the phone number. When the phone number is entered into the web-form, the web-form can post the phone number to the conference reservation agent 210 which can either store the phone number or forward the phone number to the multiport conference unit 206.

In at least one embodiment, the window displays a web-form that includes a field for entering a PIN number or access code. In one embodiment, a chairperson can enter in their PIN, while in other embodiments each participant enters in their PIN.

The window, in some embodiments, can include hyperlinks that a user can click when the user forgets his/her PIN number or when the user would like to change his/her PIN number. In one embodiment, upon clicking one of these links, the user is redirected to a web page where the user can manage his/her PIN number. In some embodiments, the link displays additional information and prompts in the original dialog box. When a user selects the "Forgot your PIN" link, the user can be asked to verify the original PIN. Once the original PIN is verified, the user can edit or change their PIN. If the user enters an incorrect original PIN, the system may notify the user of the failure and prompt the user to re-enter their PIN. The number of times a user is able re-enter the PIN may be limited. In some embodiments, the number of times a user is able to re-enter the PIN may not be limited.

When, in some embodiments, the user clicks on the "Join" button, that user's conference call information is added to a table, list or other storage repository or tracking system that stores and tracks the call information for the conference created by the user. For example, each time a conference participant enters their phone number and clicks "Join," the conference participant's phone number and an identifier identifying the conference participant is stored in a database. When the multiport conference unit 206 dials each conference participant, the multiport conference unit 206 or an application interfacing with the multiport conference unit 206, can retrieve the stored phone numbers from the database. In still another embodiment, the conference reservation agent 210 can concatenate each received phone number into a string containing each conference participant's phone number. In one embodiment, the conference reservation agent 210 formats the received phone numbers before adding them to the phone number string.

Figure 4B:
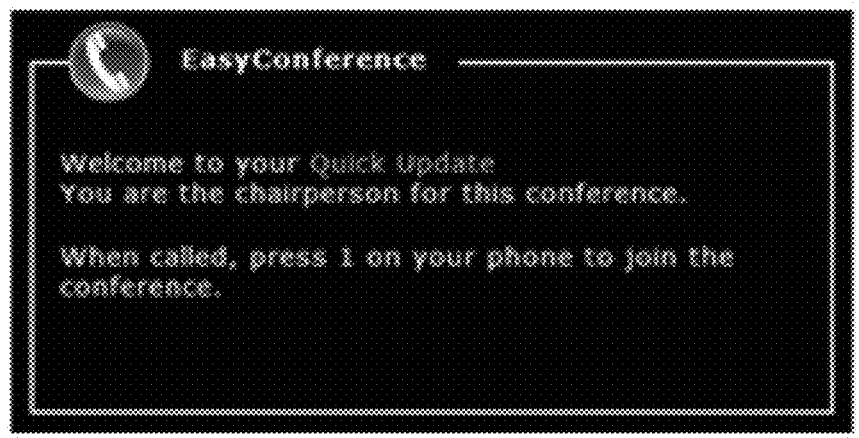

Illustrated in FIG. 4B is an embodiment of a window displayed to a conference call participant or user once that participant or user clicks the "Join" button displayed in the window described in FIG. 4A. This message, in some embodiments, instructs the conference call participant on how to answer the phone when the multiport conference unit 206 calls the conference call participant. For example, in one embodiment, the conference call participant is instructed to dial the number "1" when the multiport conference unit 206 calls the conference participant's phone number.

Figure 5A:
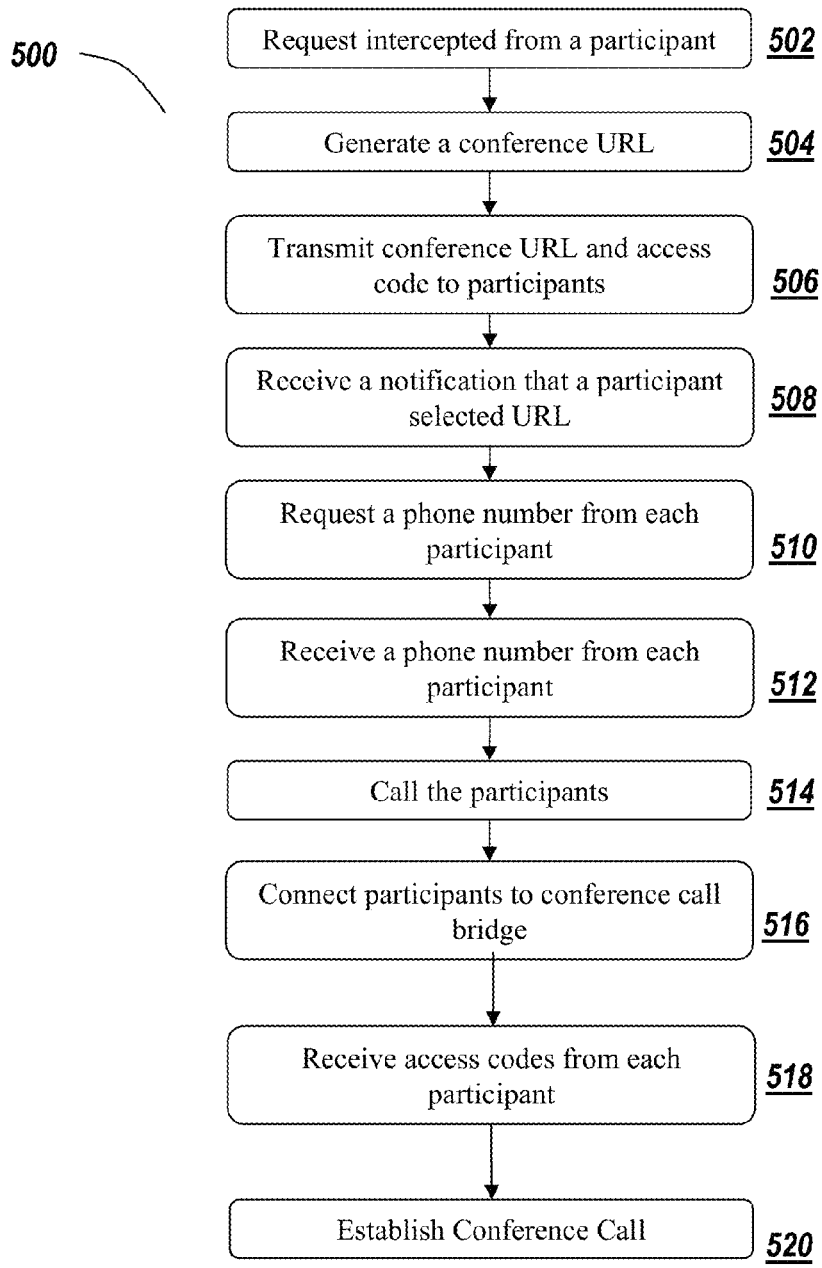
FIG. 5A illustrates a flow chart of an embodiment of a method for establishing a conference call.

Referring now to FIG. 5A, a flow diagram depicts one embodiment of a method 500 for calling conference participants to generate a conference call bridge. In brief overview, a request is intercepted from a participant (Step 502). The conference call system generates a conference URL (Step 504) and transmits the conference URL and access code to participants (Step 506). The conference call system receives a notification that a participant selected the URL (Step 508). The conference call system requests a phone number from each participant (Step 510) and receives a phone number from each participant (Step 512). The conference call system then calls each conference call participant (Step 514) and connects the conference call participants to the conference call bridge (Step 516). Upon receiving access codes from each conference call participant (Step 518), the multiport conference unit 206 establishes the conference call (Step 520).

Further referring to FIG. 5A, and in more detail, in one embodiment a conference reservation agent 210 executing on a gateway 216 intercepts or receives a user request to generate a conference (Step 502). In some embodiments, generating a conference can include establishing a conference identifier that is assigned to or associated with data stored in a storage repository. This data can include any of the following: a conference call time; a conference call date; a conference call host, e.g. the contact information for a chairperson; the name and contact information for a chairperson; the name of the company sponsoring the conference call; billing information for the conference call; settings associated with features available to users of the conference call; settings associated with limits on the number of conference participants that can attend the conference call; and data indicating the title or subject of the conference call. Establishing a conference can include inserting an entry into a database, table or other storage repository that stores data associated with the conference. In some embodiments, the conference call data is stamped with an arbitrary conference call identifier assigned at the time the conference is created. This conference identifier can be a randomly generated identifier, or can be an identifier that comprises information identifying the user who created the conference.

A conference call, in some embodiments, is a phone call whereby more than two persons can communicate over a telecommunication channel. The telecommunication channel is sometimes created by logically aggregating multiple independent telecommunication channels, e.g. the call connection between two communications devices, so that voice data transmitted by one communication endpoint, can be heard by each communication endpoint. Devices such as multiport conference units 206 can act as a switch to aggregate the multiple telecommunication channels.

In one embodiment, the conference reservation agent 210 executing on the gateway 216 can intercept the request to create a conference (Step 502). This request can be generated by a user of the gateway 216. In other embodiments, the request can be generated by a user of a client computing machine communicating with the gateway 216. In other embodiments, a user of a client computing machine communication with the gateway 216, can interact with the gateway 216 through a thin client and, using applications executing on the gateway 216, can instruct the conference reservation agent 210 to generate a conference. This request, in some embodiments, can be intercepted by the conference reservation agent 210 (Step 502).

When a request to create a conference is intercepted or received, the conference reservation agent 210 assigns a conference identifier to that conference. The conference identifier, in some embodiments, can comprise one or more numbers, letters and symbols. In some embodiments the conference identifier identifies the chairperson or chairpersons of the conference. In other embodiments, the conference identifier identifies the date and time that the conference is to take place. In yet another embodiment, the conference identifier comprises random number, letters and/or symbols arbitrarily assigned by a random number/character generator. While in some embodiments a conference identifier is assigned to the conference, in other embodiments no conference identifier is assigned to the conference.

In some embodiments, the conference reservation agent 210 generates a conference uniform resource locator (URL)

that directs conference call participants to a web-form where the user can enter his/her contact information (Step 504). In some embodiments, the URL includes any of the following elements: the conference call creator's name; a conference identifier; the date of the conference; the time of the conference; identifiers identifying the chairperson(s) for the conference; or any other identifier that can be used to uniquely identify the conference and distinguish the conference from other conferences. The web-form, in some embodiments, can be displayed within a web page or browser.

Once the URL is generated, the conference reservation agent 210 can transmit the URL and an access code to conference participants (Step 506). In some embodiments, the conference reservation agent 210 transmits a URL, while in other embodiments the conference reservation agent 210 transmits both a URL and an access code. The conference reservation agent 210 can transmit the URL to the conference participants responsive to generating the URL. In other embodiments, the conference reservation agent 210 can transmit the URL to the conference participants responsive to receiving from a user, an active directory or a web-form, a listing of the conference call participants and contact information for the conference participants. This contact information, in some embodiments, can comprise email addresses or cell phone numbers. In other embodiments, the conference reservation agent 210 transmits the URL and/or an access code to the conference participants upon receiving a command generated by the user and transmitted to the conference reservation agent 210 via the gateway 216. The access code, in some embodiments an access code assigned to each conference call participant. In other embodiments, the access code is an access code assigned to the conference.

The URL, in some embodiments, is transferred to each participant in an email sent to the email address for each participant (Step 506). In some embodiments, the URL can be sent to each participant in a text message or as an instant message. In still other embodiments, the URL can be posted on a forum such as Facebook or Twitter.

When the conference call participants receive the URL generated by the conference reservation agent 210, the conference call participants can then select the URL to join the conference. When a user selects or otherwise clicks on the URL, a notification can be sent to the gateway 216 indicating that the user, or at least one conference participant, has clicked on the URL (Step 508). In other embodiments, a notification can be sent to the conference reservation agent 210 indicating that a user has clicked on the URL (Step 508). In still other embodiments, no notification is sent to either the gateway 216 or the conference reservation agent 210. Instead, a window is generated in response to a user clicking on the URL. This window, in some embodiments, can display a web-form or other user interface that can include text requesting the user to enter a phone number. The conference identifier and any other information specific to the conference can be associated with the window and/or the web-form displayed within the window such that any information entered into the form is also associated with the conference identifier and other conference information. Therefore, rather than notify the gateway 216 each time a user clicks on a URL, in some embodiments the URL can include an address of a page hosting a web-form. Conference participants can enter their information into the web-form in order to join the conference.

In some embodiments, the web-form or window displayed responsive to a user selecting or otherwise clicking the URL, can include language indicating that the conference participant should enter his/her phone number. This form can comprise a request for a phone number that is transmitted in response to receiving a notification that the user selected the URL. Included within the form is an entry field within which the user can enter the phone number. In embodiments where any one of the gateway 216 and/or the conference reservation agent 210 is notified when a user selects a URL, a request is sent to the user asking the user to enter his/her phone number into a user interface (Step 510). This interface, in some embodiments, can be substantially the same as the interface or web-form described in FIG. 4A.

The gateway 216 receives conference call participant call information from the web-forms deployed when a conference call participant selects the URL (Step 512). In some embodiments, the call information can include any of the call information described herein. In other embodiments the call information can include a phone number of the call participant. While in some embodiments the gateway 216 receives the conference call participant call information, in other embodiments, the conference reservation agent 210 receives the call information. The gateway 216 can receive the call information when the call participant clicks the "Join" button as described above in reference to FIG. 4A.

In some embodiments, the multiport conference unit 206 can call each of the phone numbers provided to the multiport conference unit 206 (Step 514). In other embodiments, the multiport conference unit 206 can dial each phone number sequentially according to an order established by a concatenated string of phone numbers. In still other embodiments, the multiport conference unit 206 interfaces with a dialing agent that retrieves the phone numbers from a data base, table or other repository, and forwards each phone number to the multiport conference unit 206.

Upon calling each participant (Step 514), the multiport conference unit 206 connects the participants to the conference call bridge (Step 516). Connecting participants to a conference call bridge can include bundling each communication connection between the multiport conference unit 206 and a conference participant into a single communication connection. Therefore, when voice data is transmitted from a conference participant to the multiport conference unit 206, the multiport conference unit 206 receives the voice data and transmits that voice data out to each of the conference participants. In some embodiments, connecting a conference call participant to the conference call bridge can include marking the communication connection as belonging to a particular conference. Thus, when voice data is received from other telecommunication connections in that conference, the conference call participant receives the voice data. Likewise, when the conference call participant transmits voice data, the other conference call participants receive the voice data.

In some embodiments, the conference reservation agent 210 receives access codes or passcodes from each participant (Step 518). The access code can be any access code described herein. Although FIG. 5A illustrates a method 500 where the conference reservation agent 210 receives access codes from each conference call participant, in some embodiments no access code is required, therefore the conference reservation agent 210 does not receive access codes from the conference call participants. Access codes can be used, in some embodiments, to authenticate the conference call participant. When the conference reservation agent 210 receives an incorrect access code, the conference reservation agent 210 can prompt the user to re-enter the access code. When the conference reservation agent 210 receives a predetermined number of access codes, the conference reservation agent 210 can terminate the communication connection between that conference call participant and the multiport conference unit 206. In some embodiments, the conference reservation agent 210 may terminate the communication connection immediately after receiving an incorrect access code. In still other embodiments, the conference reservation agent 210 may request an access code from certain participants such as the chairperson(s) and other classes of participants.

Upon receiving the necessary access codes, the multiport conference unit 206 establishes the conference call (Step 520). In embodiments where no access codes are required, the conference call is established as soon as at least two conference participants are successfully connected to the conference call bridge by the multiport conference unit 206. In other embodiments where access codes are required or otherwise utilized, the conference call may not be established until a predetermined number of access codes have been authorized. When an access code is required from certain participants such as the chairperson(s), the conference call can be established once those persons have entered the correct access code.

Establishing the conference call or conference call bridge, in some embodiments, does not occur until the gateway 216 receives at least two call acceptance acknowledgements and an access code from a chairperson. The call acceptances, in some embodiments, can be an electronic notification created when a call participant answers the call placed by the multiport conference unit 206 and/or presses an access code, or other button to join the conference call.

Figure 5B:
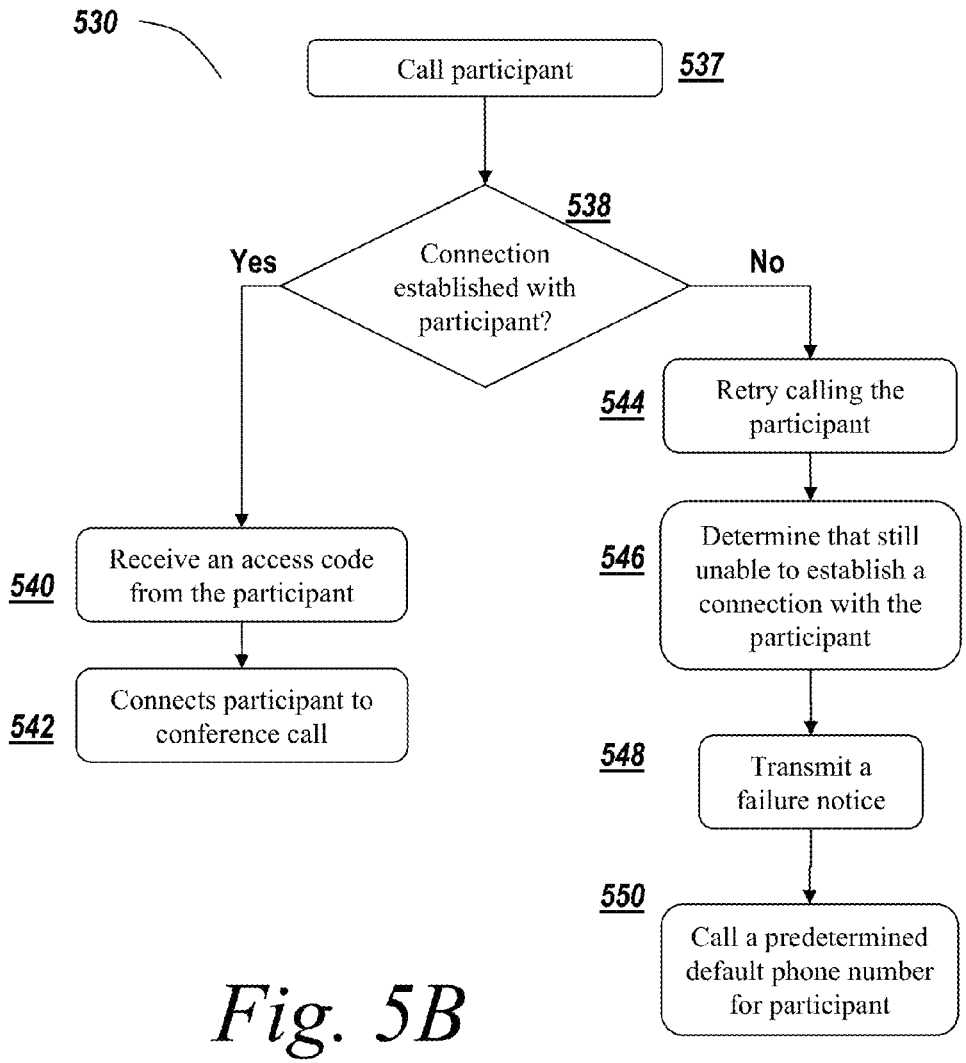
FIG. 5B illustrates a flow chart of an embodiment of a method for establishing a conference call.

Illustrated in FIG. 5B is a flow diagram that depicts an embodiment of a method 530 for calling conference participants to generate a conference call bridge 500. In brief overview, the conference call system calls the participant (Step 537). The conference call system determines whether it is able to establish a connection with the participant (Step 538). If the system is able to establish a connection, the participant is prompted to enter and the system receives an access code (Step 540). If the code is valid, the participant is connected to the conference call (Step 542). If the system is unable to establish a connection, the system attempts to re-dial the user-specified phone number (Step 544). If the system is unable to establish a connection after re-trying the user-specified number, then a failure notice is transmitted (Step 546) and the system calls a default number (Step 548).

Further referring to FIG. 5B, and in more detail, in one embodiment the system, the gateway 216, the conference reservation agent 210 or the multiport conference unit 206 initiate a call to the conference call participant (Step 537). In some embodiments, the multiport conference unit 206 sends a message to the gateway 216 when a communication connection is established between the multiport conference unit 206 and the conference call participant. In other embodiments, the gateway 216 or the conference reservation agent 210 executing on the gateway 216 queries the multiport conference unit 206 at predetermined intervals to determine whether a communication connection was established between the conference call participant and the multiport conference unit 206. In still other embodiments, a flag or variable changes or is otherwise set to an "On" or "Connected" status once a telecommunication link is established between the conference call participant and the multiport conference unit 206. In most embodiments, the telecommunication connection or link is established by a communications device 102 of the conference call participant and the multiport conference unit 206.

When a determination is made that a connection was established between the conference call participant and the multiport conference unit 206 (Step 538), the gateway 216 or conference reservation agent 210 receives from one or more conference call participants an access code (Step 540). As described in FIG. 5A with respect to Step 518, in some embodiments no access code is needed, while in other embodiments an access code is required of select conference call participants such as the chairperson(s). Upon establishing the connection and receiving the necessary access codes, the multiport conference unit 206 establishes the conference call.

When a determination is made that a connection was not established between the conference call participant and the multiport conference unit 206 (Step 538), the multiport conference unit 206 can try again to call the conference participant at the number specified by the conference participant in the web-form (Step 544). When a further determination is made that a connection has not yet been made between the multiport conference unit 206 and the conference participant (Step 546), then the gateway 216 or conference reservation agent 210 can transmit an error message to the conference participant, the chairperson(s) or to other conference participants. In some embodiments, the gateway 216 can transmit a failure notice with details of the failed attempt, such as the phone number used, time of attempt (Step 546). In some embodiments, the failure notice is transmitted to only the chairperson. In other embodiments, the failure notice is transmitted to all the participants. In other embodiments, the failure notice is only transmitted to those participants currently connected to the conference call bridge. In other embodiments, no failure notice is sent and the multiport conference unit 206, responsive to determining that a connection was not made, stops trying to contact the conference participant. In still other embodiments, the conference reservation agent 210 transmits another URL to the conference participant requesting that the participant enter a new phone number.

In some embodiments, the multiport conference unit 206 can call a default phone number assigned to the conference call participant. This default phone number can be hard programmed into the conference, or in other embodiments can be stored along with the contact information entered by the user. Other embodiments include a conference reservation agent 210 that communicates with an active directory system or other directory system executing on either the gateway 216 or on another computer communicating with the gateway 216. This directory can store default phone numbers for each participant. When a determination is made that the conference participant cannot be reached at the phone number specified by the conference participant, the conference reservation agent 210 can retrieve the default phone number for the conference participant and forward the default phone number to the multiport conference unit 206 which then calls the default number.

In one embodiment, if the system at any time is able to establish a connection with the participant, either by the user-specified number or a default phone number, the system connects the participant to the conference.

In some embodiments of the methods and systems described herein, the conference reservation agent 210, when a conference call is established, can display to the conference call participants a listing of the participants and can further display features typical with CITRIX's GOTOMEETING. Therefore, in one embodiment, a user interface of the conference is displayed on each participant's screen. The chairperson(s), or the conference participants can control the conference call by recording the conference, timing the conference, muting the conference, starting and stopping the conference, and any other functions for controlling the conference.

The methods and systems described herein may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the present disclosure has described multiple embodiments of systems and methods for launching an application into an existing isolation environment, it should be understood by those skilled in the art that various changes in form and detail may be made therein without departing from the spirit and scope of the invention as defined by the following claims.

What is claimed is:

1. A method for generating a conference call bridge by calling conference participants using at least one multiport conference unit, the method comprising:

receiving, by a gateway device of a conference call system comprising at least one multiport conference unit, a request from a user to initiate a conference;

generating, by the gateway device, a uniform resource locator (URL) comprising a conference identifier representing a conference generated responsive to receiving the request;

transmitting, by the gateway device responsive to receiving from an active directory system executing on a computing device contact information for each of a plurality of conference participants, the URL to the contact information for each of the plurality of conference participants identified by a user, the active directory system storing the contact information;

receiving, by the gateway device, from each of a plurality of conference participants, call information comprising a phone number specified by each conference participant;

calling from the at least one multiport conference unit to each conference participant at the phone number specified by each conference participant; and establishing, by the multiport conference unit, a conference call bridge responsive to receiving at least two call acceptance acknowledgements from at least two conference participants, the conference call bridge comprising a communication connection between the conference call bridge and communication devices of the at least two conference participants.

2. The method of claim 1, further comprising:

receiving, by the gateway device, a notification indicating at least one conference participant selected the URL; and requesting, by the gateway device responsive to receiving the notification, a phone number from the at least one conference participant.

3. The method of claim 2, wherein receiving the call information further comprises receiving call information specified by the conference participant responsive to receiving the gateway device request.

4. The method of claim 2, further comprising associating each conference participant with the conference identifier representing the conference.

5. The method of claim 2, wherein requesting a phone number further comprises sending the at least one conference participant a web-form.

6. The method of claim 1, wherein receiving the call information further comprises receiving call information comprising phone numbers and conference participant identifiers.

7. The method of claim 1, further comprising receiving, by the at least one multiport conference unit, an access code from a conference participant designated chairperson.

8. The method of claim 7, wherein establishing the conference call bridge further comprises establishing, by the at least one multiport conference unit, the conference call bridge responsive to receiving the at least two call acceptance acknowledgements and the access code from the chairperson.

9. The method of claim 1, further comprising determining that a conference participant cannot be reached at the phone number specified by the conference participant, retrieving a default phone number for the conference participant from the active directory server system and calling by the multiport conference unit the default phone number.

10. The method of claim 1, further comprising determining a received phone number is invalid, and calling a predetermined default phone number.

11. A method for responding to a request to initiate a conference call, the method comprising:

receiving, by a conference call system comprising a gateway device and at least one multiport conference unit, a request from a user to initiate a conference;

generating, by the conference call system, a uniform resource locator (URL) comprising a conference identifier representing a conference generated responsive to receiving the request;

transmitting, by the gateway responsive to receiving from an active directory system executing on a computing device contact information for each of a plurality of conference participants, the URL to the contact information for each of the plurality of conference participants identified by the user, the active directory system storing the contact information;

receiving, by the gateway device, a notification indicating at least one conference participant selected the URL; and requesting, by the gateway device responsive to receiving the notification, a phone number from the at least one conference participant, the phone number used by the at least one multiport conference unit to call the at least one conference participant to establish a conference call bridge.

12. The method of claim 11, further comprising:

receiving, by the gateway device from each of the plurality of conference participants, call information comprising a phone number specified by each conference participant responsive to the gateway device request;

calling from the at least one multiport conference unit to each conference participant at the specified phone number; and establishing, by the multiport conference unit, a conference call bridge responsive to receiving at least two call acceptance acknowledgements from at least two conference participants, the conference call bridge comprising a communication connection between the conference call bridge and communication devices of the at least two conference participants.

13. The method of claim 11, further comprising associating each conference participant with the conference identifier representing the conference.

14. The method of claim 11, wherein requesting a phone number further comprises sending the at least one conference participant a web-form.

15. The method of claim 12, wherein receiving the call information further comprises receiving call information comprising phone numbers and conference participant identifiers.

16. The method of claim 12, further comprising receiving, by the at least one multiport conference unit, an access code from a conference participant designated chairperson.

17. The method of claim 16, wherein establishing the conference call bridge further comprises establishing, by the at least one multiport conference unit, the conference call bridge responsive to receiving the at least two call acceptance acknowledgements and the access code from the chairperson.

18. The method of claim 12, wherein calling further comprises calling with the at least one multiport conference unit via a telecommunication switching system interconnected with a public switched telecommunication network.

19. The method of claim 12, further comprising determining a received phone number is invalid, and calling a predetermined default phone number.

20. The method of claim 12, further comprising determining that a conference participant cannot be reached at the phone number specified by the conference participant, retrieving a default phone number for the conference participant from the active directory server system and calling by the multiport conference unit the default phone number.

* * * * *